(12) United States Patent
Hiratsuka et al.

(10) Patent No.: US 6,587,956 B1
(45) Date of Patent: Jul. 1, 2003

(54) SEMICONDUCTOR MEMORY APPARATUS WITH POWER CONSUMPTION CONTROL

(75) Inventors: Shinji Hiratsuka, Tokyo (JP); Kazuhiko Bando, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/198,575

(22) Filed: Nov. 24, 1998

(30) Foreign Application Priority Data

Jan. 19, 1998 (JP) .......................... 10-007226

(51) Int. Cl.$^7$ ................................ G06F 1/04
(52) U.S. Cl. ....................... 713/500; 713/600
(58) Field of Search ................ 713/500, 501, 713/502, 503, 600, 601, 167

(56) References Cited

U.S. PATENT DOCUMENTS

| | | | | |
|---|---|---|---|---|
| 5,309,420 A | * | 5/1994 | Jaquette et al. | 369/58 |
| 5,388,249 A | * | 2/1995 | Hotta et al. | 395/550 |
| 5,432,468 A | * | 7/1995 | Moriyama et al. | 327/152 |
| 5,479,644 A | * | 12/1995 | Hongo | 395/550 |
| 5,481,580 A | * | 1/1996 | Guzinski | 377/29 |
| 5,504,701 A | * | 4/1996 | Takahashi et al. | 365/185.04 |
| 5,550,489 A | * | 8/1996 | Raab | 326/93 |
| 5,652,733 A | * | 7/1997 | Chen et al. | 365/233 |
| 5,684,997 A | * | 11/1997 | Kau et al. | 710/260 |
| 5,724,592 A | * | 3/1998 | Garner | 713/322 |
| 5,767,904 A | * | 6/1998 | Miyake | 348/362 |
| 5,781,783 A | * | 7/1998 | Gunther et al. | 713/320 |

FOREIGN PATENT DOCUMENTS

EP   0 316 878 A2 *  5/1989  ........... H03D/1/22

* cited by examiner

Primary Examiner—James P. Trammell
Assistant Examiner—Mary Cheung
(74) Attorney, Agent, or Firm—Venable; James R. Burdett

(57) ABSTRACT

A process controller 130 and clock controller 190 are used to detect transfer rates when performing data write and read operations involving memories 180-1 to 180-n for recording data. The clock controller 190 frequency-divides clock signals generated by an oscillator unit 191, thereby generating a plurality of frequency-divided clocks having different frequencies. One of the frequency-divided clocks is selected, according to the transfer rate detection results, and used as the operating clock for an interface unit 110, the process controller 130, a buffer unit 140, and a transfer controller 150. By altering the operating speeds of the circuits 110, 140, and 150, according to the data transfer rate, power consumption can be reduced.

15 Claims, 8 Drawing Sheets

170 : MEMORY BUS

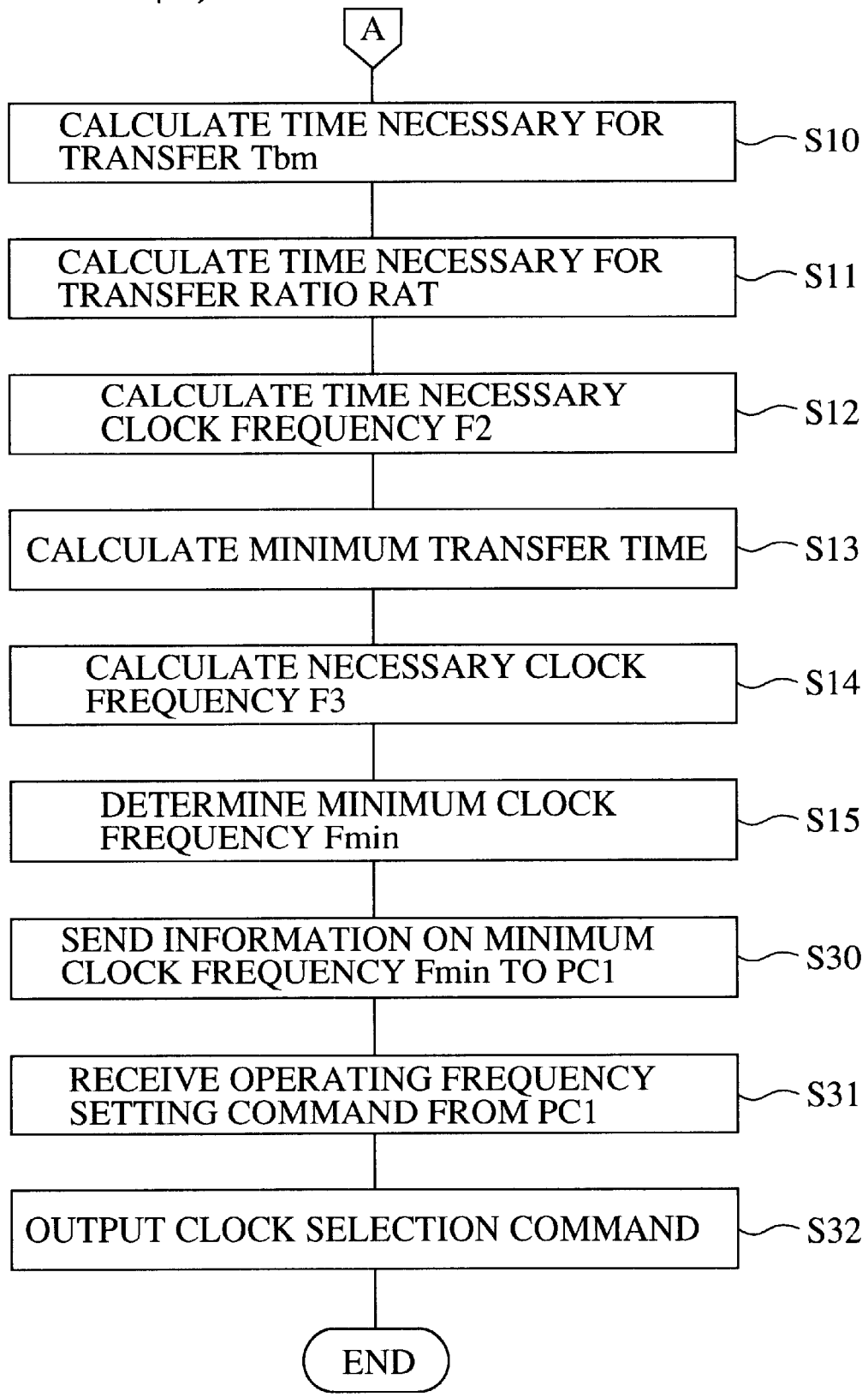

SEMICONDUCTOR MEMORY APPARATUS WITH POWER CONSUMPTION CONTROL

BACKGROUND OF THE INVENTION

1. Field of the Invention

This invention concerns a semiconductor disk apparatus (hereinafter "disk card") used, for example, for expanding the peripheral functions of a personal computer.

2. Description of Related Art

Disk cards are used, for example, as auxiliary memory media for personal computers. A disk card has EEPROMs (electrically erasable programmable read only memories) mounted on it, in which EEPROMs are stored data in the form of files. By EEPROM herein is meant an electrically erasable and writable nonvolatile memory such, for example, as a flash memory.

A disk card sends and receives file data to and from the personal computer processor via a common bus. Integrated circuits are accommodated on the disk card, together with multiple EEPROMs, for distinguishing between file data read and write operations, and for performing file data write control and read control.

The integrated circuits are provided internally with an oscillator circuit. This oscillator circuit supplies the circuit clocks in the integrated circuits with a clock signal having a frequency of, for example, 80 MHz.

In conventional disk cards, the frequency of the clock signal generated in the oscillator circuit is set irrespective of the data transfer rate between the card and the personal computer. For this reason, when the data transfer rate is slow, the disk card operates at a clock frequency that is faster than necessary. The higher the clock frequency, the more electric power is consumed by the disk card. Conversely, when the clock frequency is made low in order to reduce power consumption, the speed of disk card operation is slowed down so that it can no longer keep up with the data transfers from the personal computer.

Also, in cases where a plurality of EEPROMs provided on the disk card perform write operations simultaneously, the current supplied to the disk card from the personal computer power supply becomes very large. Accordingly, when the capacity of the personal computer power supply is limited, for example, the number of EEPROMs mounted on one disk card must be limited also, making it impossible to provide large memory capacity on the disk card.

SUMMARY OF THE INVENTION

An object of the present invention is to provide a semiconductor disk apparatus wherewith power consumption can be reduced without lowering the data transfer rate.

To that end, the semiconductor disk apparatus to which the present invention pertains comprises: memory means for storing data; transfer means for transferring data input from the outside to the memory means and transferring data read from the memory means to the outside; oscillator means for generating a clock signal at a fixed frequency; and operating clock supply means for dividing the frequency of the clock signal according to the transfer rate of the transfer means and supplying that clock signal to the transfer means.

By altering the operating clock frequency according to the data transfer rate, it is possible to reduce the power consumption of the integrated circuitry configuring the semiconductor disk apparatus.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

A first embodiment is now described.

A semiconductor disk apparatus (hereinafter "disk card") in the first embodiment of the present invention is described, making reference to FIGS. 1, 2, and 3.

Figure 1:
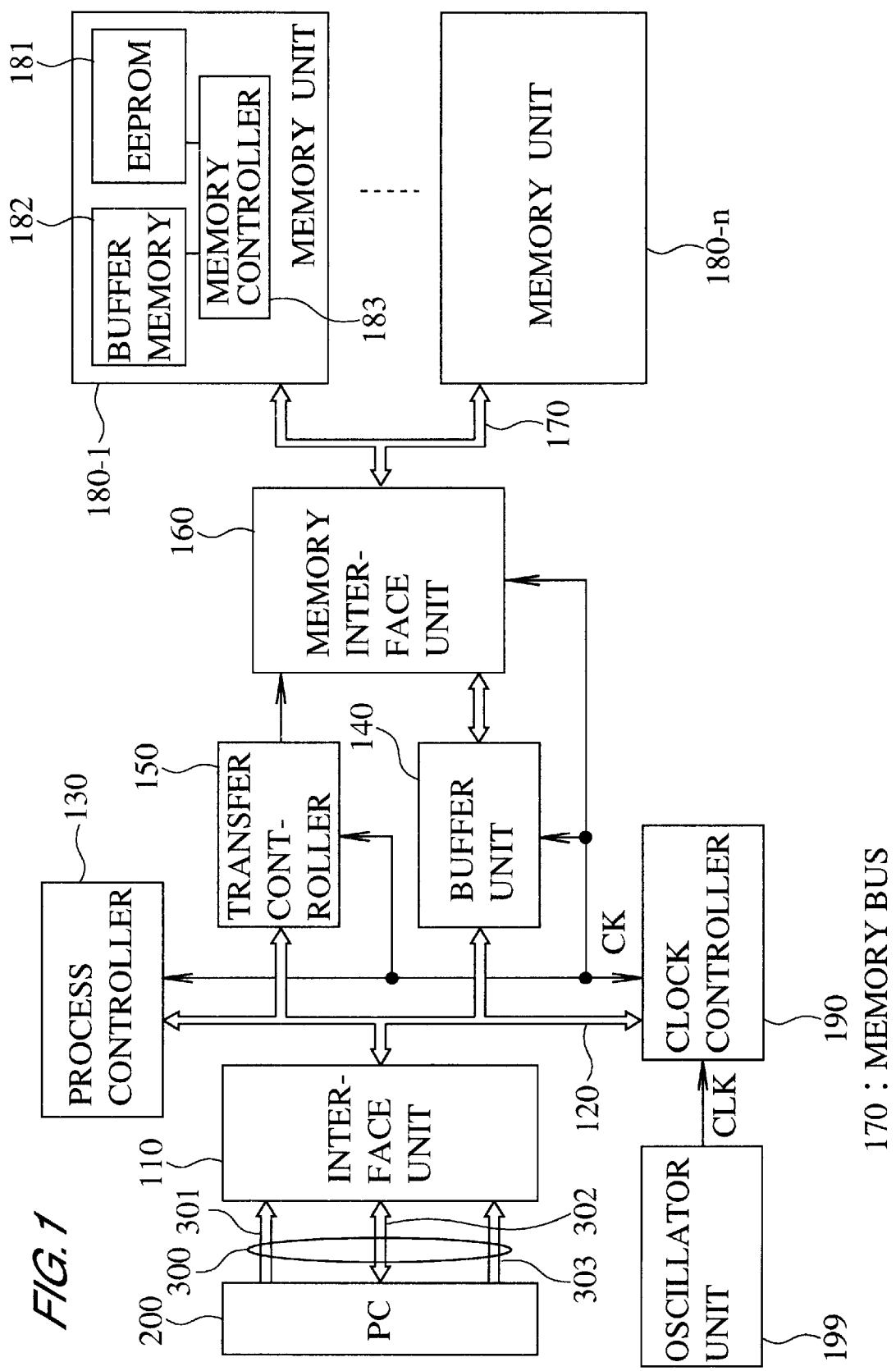
FIG. 1 is a simplified block diagram of a semiconductor disk apparatus in a first embodiment.

The disk card 100 diagrammed in FIG. 1 is an auxilliary memory device for storing, in file form, data for a host computer (which, in this embodiment, is a personal computer 200). The disk card 100 sends and receives file data FD to an from the PC (personal computer) 200 by means of a magnetic disk interface. The disk card 100 and PC 200 send file data FD, in 1-word (16 bit) units, in 512-byte magnetic disk file format, for example, back and forth over a common bus 300. The common bus 300 comprises an address bus 302, and control bus 303.

An interface unit 110 is connected to the common bus 300 and to an internal bus 120. The interface unit 110 sends and receives file addresses FA, field data FD, and control signals, etc., back and forth between the common bus 300 and the internal bus 120. The file addresses FA correspond to the head numbers, cylinder numbers, and sector numbers, etc., of magnetic disk drives. The control signals contain read control signals RD and write control signals WR, etc.

The process controller 130 comprises a processor and memory for storing control programs and data. This controller 130 is provided with functions for receiving file addresses FA, for sending and receiving control signals, and functions for performing overall control inside the disk card. The controller 130 also functions to determine the frequency of the clock signal CK, as will be described subsequently.

The buffer unit 140 temporarily holds file data FD. This buffer unit 140 is configured so that it can simultaneously hold file data in sector units (512 bytes).

The transfer controller 150 is equipped with functions for controlling the transfer, etc., of file data FD between the interface unit 110 and the buffer unit 140, based on control instructions from the process controller 130.

A memory interface unit 160 serves as the interface for transferring file data FD between the buffer unit 140 and memory units 180-1 to 180-n. The memory interface unit 160 is connected to the memory units 180 via a memory bus 170.

The n memory units 180-1 to 180-n each comprise an EEPROM 181, buffer memory 182, and memory controller 183. The EEPROM 181 stores file data in sector units. Each buffer memory 182 temporarily holds data written to the EEPROM 181 or data read from the EEPROM 181. The memory controller 183 controls the transfer of file data FD between the EEPROM 181 and buffer memory 182. Each memory unit 180-1 to 180-n, respectively, is provided with different addresses.

The clock controller 190 is configured so that, based on control signals input from the process controller 130, it measures the time required to transfer file data between the disk card 100 and the PC 200, frequency-divides the clock signal CLK, and outputs the clock signal CK.

An oscillator unit 199 generates a clock signal CLK having a fixed frequency.

Figure 2:
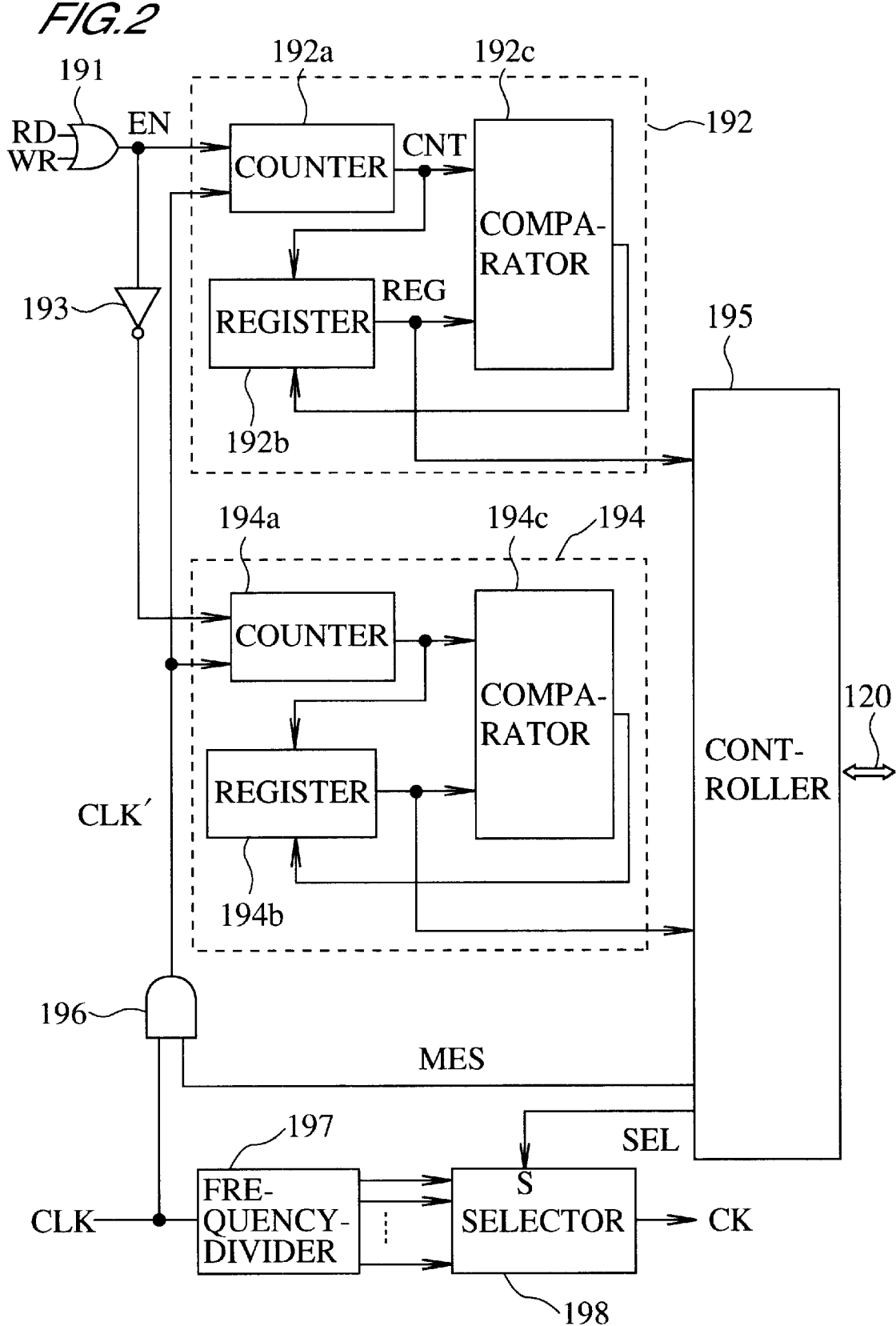
FIG. 2 is a simplified block diagram representing the internal configuration of the clock control unit diagrammed in FIG. 1.

FIG. 2 is a simplified diagram of the internal configuration of the clock controller 190 diagrammed in FIG. 1.

In FIG. 2, an OR gate 191 inputs read control signals RD from one input terminal, and inputs write control signals WR from the other input terminal. The OR gate 191 takes the logical sum of these control signals RD and WR and outputs them as enable signals EN. The control signals RD and WR are supplied from the interface unit 110 to the clock controller 190 via the internal bus 120. The output terminal of the OR gate 191 is connected to a valid time measurement unit 192, and also, through an inverter 193 that inverts the signals, to an invalid time measurement unit 194.

In the valid time measurement unit 192, a counter 192a inputs the clock signal CLK' output from the AND gate 196 together with the enable signal EN. The counter 192a is configured so that it counts the clock beats of the clock signal CLK' when the enable signal EN is at the high (i.e. "valid") level. The result of this counting is output as count data CNT 1. A register 192b temporarily holds the count data signal CNT 1. The data held in the register 192b is rewritten by a clock pulse P1. A comparator 192c inputs the count data CNT 1 from the counter 102a and the data REG 1 held in the register 102c, and outputs the clock pulse P1 when the count data CNT 1 are smaller than the held data REG 1.

In the invalid time measurement unit 194, a counter 194a inputs the enable signal EN output by the inverter 193 and the clock signal CLK'. The counter 194a is configured so that it counts the clock signal CLK' clock beats when the enable signal EN is low (i.e., "invalid"). This counting result is output as count data CNT 2. Register 194b temporarily holds the count data signal CNT 2. The data held in the register 194b are rewritten by the clock pulse P2. A comparator 194c inputs the count data CNT 2 from the counter 104a and the holding data REG 2 in register 104c, and outputs the clock pulse P2 when the count data CNT 2 are smaller than the holding data REG 2.

A controller 195 comprises functions for inputting the data signals REG 1 and REG 2 from the registers 192b and 194b and outputting these on the internal bus 120, functions for inputting measurement instruction commands from the internal bus 120 and turning a measurement control signal MES on (high level), and functions for inputting clock selection commands from the internal bus 120 and turning the selection signal SEL on.

The AND gate 196 inputs the clock signal CLK generated by the oscillator unit 199 from one input terminal, and inputs the signal MES from the other input terminal. In other words, when the signal MES is high, the AND gate 196 outputs the clock signal CLK without modification as the clock signal CLK', but outputs nothing when the signal MES is low.

A frequency divider 197 inputs the clock signal CLK and outputs clock signals that are frequency-divided in ratios of 1/1, 1/2, 1/4, and so on, respectively.

A selector 198 inputs multiple types of frequency-divided clock from the frequency divider 197 and selects one of these clocks on the basis of the selection signal SEL. The frequency-divided clock selected by the selector 198 executes an output from the clock controller 190 as the clock signal CK.

Figure 3A:
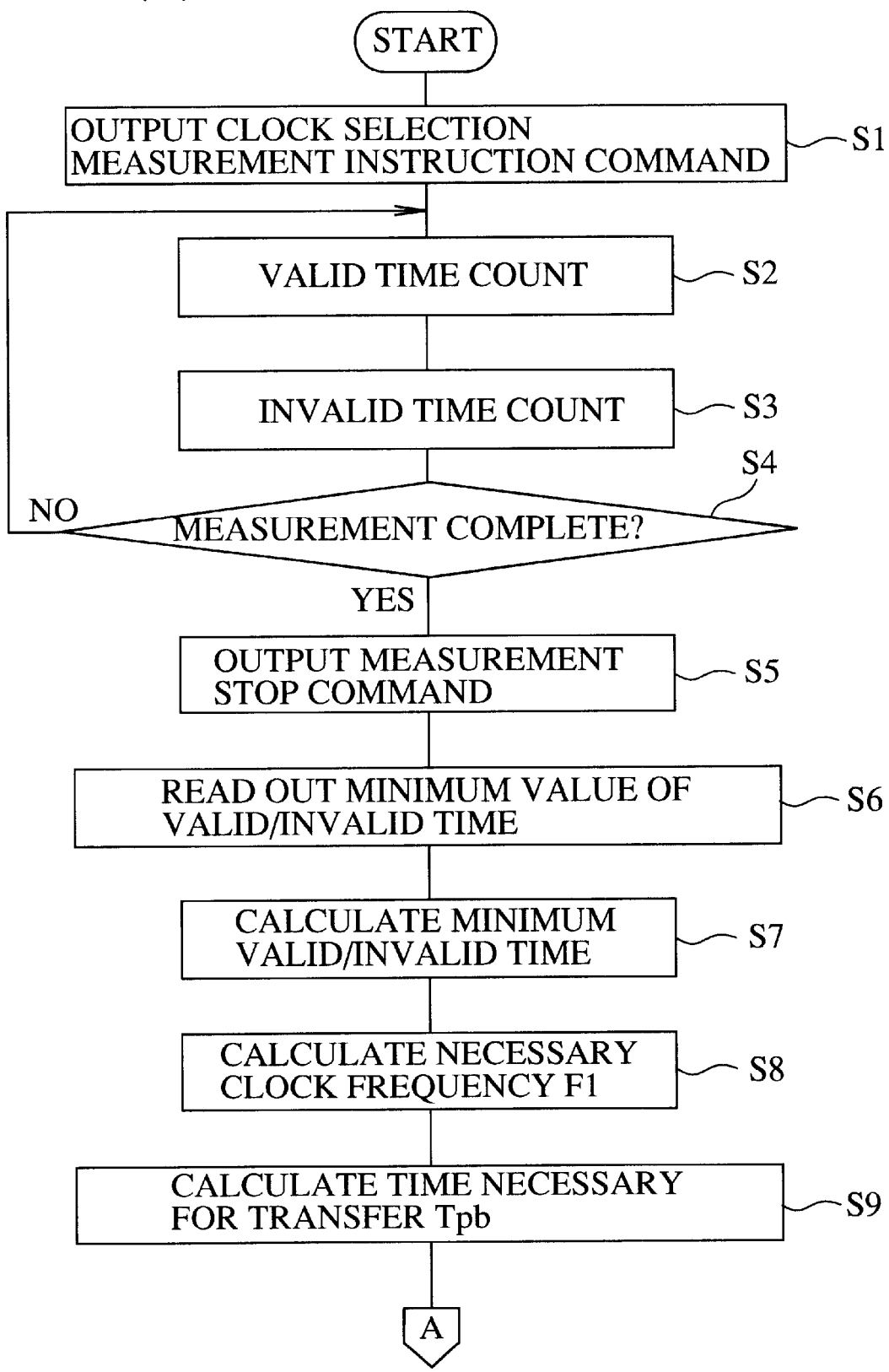
FIG. 3 is a flowchart for describing the operations of the semiconductor disk apparatus in the first embodiment.
Figure 3B:
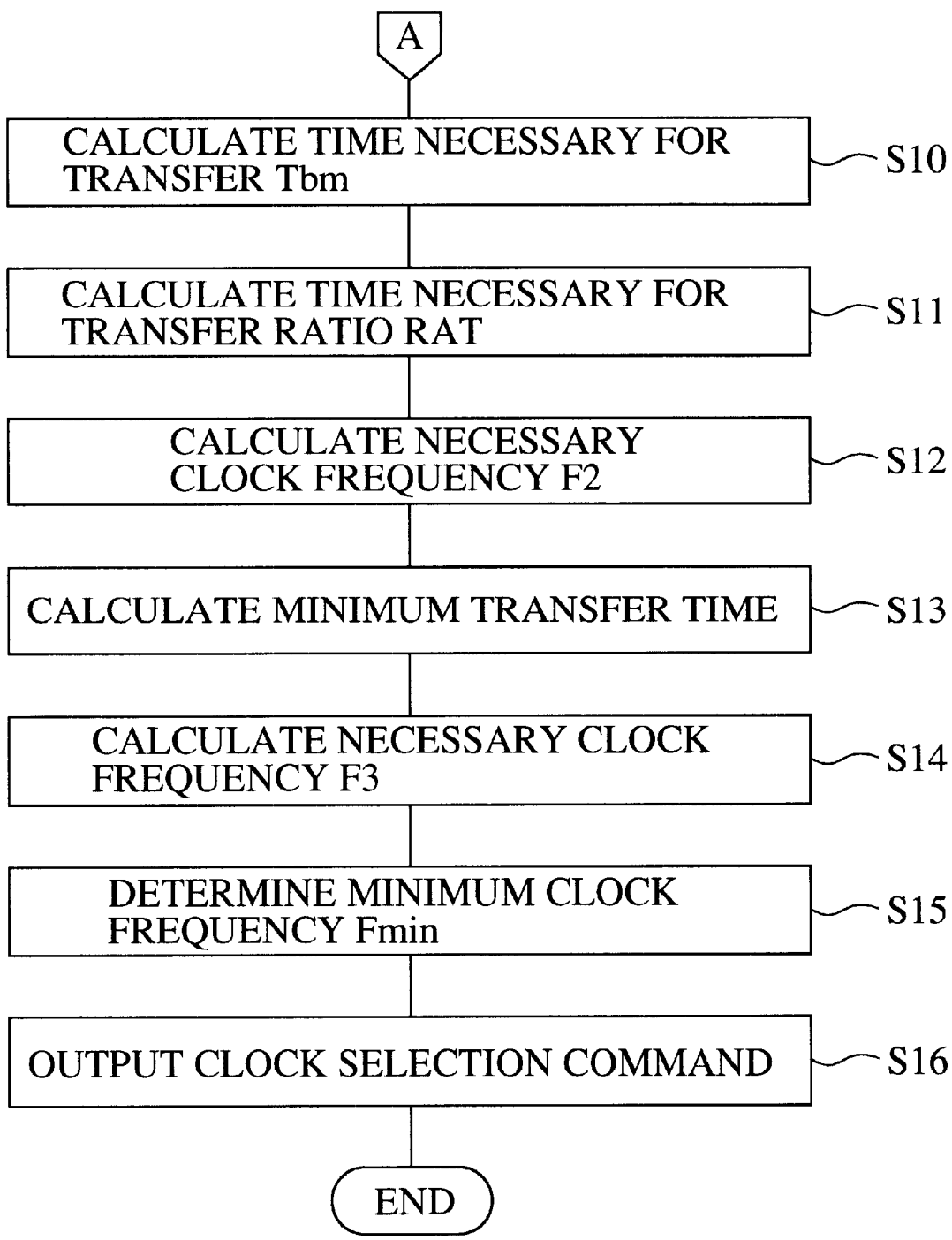

Next, making reference to FIG. 3, the operation of the disk card 100 diagrammed in FIGS. 1 and 2 is described.

When the disk card 100 and PC 200 are connected, and power is supplied from the PC 200 to the disk card 100, the oscillator unit 199 begins oscillating at a prescribed frequency, thereby supplying a fundamental clock signal CLK at 80 MHz, for example, to the clock controller 190.

In step S1, the process controller 130 outputs a 1/1 clock selection command and a measurement instruction command. These commands are sent to the clock controller 190 over the internal bus 130.

The controller 195 in the clock controller 190, upon receiving the 1/1 clock selection signal, controls the selector 198 so that a 1/1 frequency-divided clock is selected. Hence the frequency of the clock signal CK output from the clock controller 190 becomes 80 MHz, for example, and the process controller 130, buffer unit 140, transfer controller 150, and memory interface unit 160 begin operating based on the clock signal CK.

When the power comes up, maximum values (9999, for example) are stored as initial values in the registers 192b and 194b provided in the valid time measurement unit 192 and invalid time measurement unit 194 in the clock controller 190.

The measurement instruction commands sent out by the process controller 130 in step S1, described above, are received into the controller 195 in the clock controller 190. The controller 195, upon receiving the measurement instruction command, sets the measurement control signal MES to the high level. Hence the fundamental clock signal CLK at 80 MHz is supplied to the counters 192a and 194a through the AND gate 196. When the enable signal EN is high, the valid time measurement unit 192 counts the clock beats during the valid time (step S2), and when the enable signal EN is low, that is, when the signal $\overline{\text{EN}}$ is high, the invalid time measurement unit 194 counts the clock beats during the invalid time (step S3).

With the valid time count in step S2, during the time that the enable signal EN is high, the counter 192a counts the clock beats in the clock signal CLK'. Then, when the signal EN goes low, the comparator 192c compares the count data CNT 1 of the counter 192a and the holding data REG 1 in the register 192b, and outputs the clock pulse P1 when the counted value CNT 1 is smaller than the stored value REG 1. By means of this clock pulse P1, the count data CNT 1 are stored as the holding data REG 1 of the register 192b.

With the invalid time count of step S3, while the signal $\overline{\text{EN}}$ is high, the counter 194a counts the clock beats of the clock signal CLK'. Then, when the signal $\overline{\text{EN}}$ goes low, the comparator 194c compares the count data CNT 2 and the holding data REG 2 in the register 192b, and outputs the clock pulse P2 when the counted value CNT 2 is smaller than the stored value REG 2. By means of this clock pulse P2, the count data CNT 2 are stored as the holding data REG 2 of the register 194b.

In step S4, the process controller 130 compares the number of times that the valid time count and the invalid time count were executed against a prescribed value (300 times, for example). If the number of executions is less than the prescribed value, step 2 is jumped to, and the subroutines in steps S2 to S4 are repeated. When the number of executions reaches the prescribed value, steps S5 and following are executed.

In step S5, the process controller 130 outputs a stop measurement command. When the controller 195 inside the clock controller 190 receives the stop measurement command, the measurement control signal MES is made to go low. Thus the AND gate 196 output is fixed at the low level, and the counters 192a and 194a stop operating.

In step S6, the process controller 130 reads the holding data REG 1 and REG 2 in the registers 192b and 194b via the internal bus 120.

In step S7, the process controller 130, using the data REG 1 and REG 2, calculates a minimum valid time and a minimum invalid time. These computations are performed using the formulas given in (1) below.

$$\left.\begin{array}{l} \text{Minimum valid time} = \dfrac{REG\ 1}{\text{Fundamental clock } CLK \text{ frequency}} \\ \text{Minimum invalid time} = \dfrac{REG\ 2}{\text{Fundamental clock } CLK \text{ frequency}} \end{array}\right\} \quad (1)$$

As an example, suppose that, during the measurement time (that is, the period of time wherein the measurement control signal MES is high), a minimum value of 796 is held in the register 192b in the valid time measurement unit 192, and a minimum value of 3190 is held in the register 194b in the invalid time measurement unit 194. At such time, the fundamental clock frequency is 80 MHz, yielding the following results.

Minimum valid time=9.95 μs

Minimum invalid time=39.875 μs

In step S8, the process controller 130 calculates a first necessary clock count F1 using the computational results from the formulas in (1) above and a necessary clock count that is predetermined data. A necessary clock count is the number of clock beats required during the valid time and the invalid time in order for the disk card to perform its internal operations normally. These computations are made using the formulas given in (2) below.

$$\left.\begin{array}{l} \text{Necessary clock} \\ \text{frequency during} = \dfrac{\text{Minimum valid time}}{\text{Necessary clock count during valid time}} \\ \text{valid time} \\ \text{Necessary clock} \\ \text{frequency during} = \dfrac{\text{Minimum invalid time}}{\text{Necessary clock count during invalid time}} \\ \text{invalid time} \end{array}\right\} \quad (2)$$

In the case where, for example, both the necessary clock count during valid time and the necessary clock count during invalid time are 5 clock beats, the following results are yielded.

Necessary clock frequency during valid time=502.6 kHz

Necessary clock frequency during invalid time=125.4 kHz

The higher value of these two clock frequency (that is, 502.6 kHz in this case) is adopted as the first necessary clock frequency F1.

The first necessary clock frequency F1 found here is the lowest allowable clock frequency necessary to temporarily maintain the field data FD in the buffer unit 40, without causing any delay, when, in the minimum time interval, field data FD are transferred from the PC 200 in 1 word (=16 bits) units.

In step S9, the process controller 130 uses the formula given in (3) below to calculate the transfer time per bit (Tpb) between the PC 200 and the buffer unit 140.

$$\text{Necessary transfer time } Tpb = \dfrac{\text{Minimum valid time} + \text{Minimum invalid time}}{\text{Number of data transferred}} \quad (3)$$

If we assume a minimum valid time of 9.95 μs and a minimum invalid time of 39.875 μs as above, since the number of data transferred is 16 bits, the following result is yielded.

Necessary transfer time Tpb=3.114 μs/bit

In step S10, the process controller 130 calculates the transfer time per bit (Tbm) between the buffer unit 140 and the memory unit 180 using formula (4) below.

$$\text{Transfer time } Tbm = \dfrac{\text{Data transfer cycle time}}{\text{Number of data transferred per cycle}} \quad (4)$$

If we assume, for example, that the number of data transferred per cycle between the buffer unit 140 and the memory unit 180 is 1 bit and the data transfer cycle time is 5 μs, then we obtain the following result.

Transfer time Tbm=5 μs/bit

In step S11, the process controller 130 calculates the ratio RAT between the transfer time Tbp and the transfer time Tbm using formula (5) below.

$$\text{Transfer time ratio } RAT = \dfrac{\text{Transfer time } Tbm}{\text{Transfer time } Tpb} \quad (5)$$

If we assume, for example, as above, a transfer time Tbm=5 μs/bit and a transfer time Tbp=3.114 μs/bit, we obtain the following result.

Transfer time ration RAT=1.601

In step S12, the process controller 130 calculates the second necessary clock frequency F2 using formula (6) below.

$$\text{2nd necessary clock frequency } F2 = F1 \times RAT \quad (6)$$

If we assume, as above, that the first necessary clock frequency F1=502.6 kHz, and that the transfer time ratio RAT=1.601, then we obtain the following result.

2nd necessary clock ratio frequency F2=807.2 kHz

This second necessary clock frequency F2 is the clock frequency needed to prevent wait times developing in data transfers with the buffer unit 140.

In step S13, the process controller 130 calculates the minimum transfer time per sector using formula (7) below.

$$\text{Minimum transfer time} = \dfrac{\text{Internal operating time in memory unit}}{\text{Number of memory units on board}} \quad (7)$$

This minimum transfer time is the time wherewith transfer is not delayed when, after transferring file data FD to one of the memory units 180-1 to 180-n, the next file data FD are transferred to the same memory unit.

If we assume that either the design value or measured value for the internal operating time Tm of the memory unit is 10 ms, and that the number of mounted memory units n=5, the following result is obtained.

Minimum transfer time=2.5 ms

In step S14, the process controller 130 calculates a third necessary clock frequency F3 using formula (8) below.

$$\text{3rd necessary clock frequency } F3 = \frac{\text{Number of cycles per sector}}{\text{Minimum transfer time}} \quad (8)$$

If we assume 4096 cycles as the number of cycles per sector, the result is as follows.

3rd necessary clock frequency F3=1.64 MHz

In step S15, the process controller 130 determines the minimum clock frequency Fmin, using the first, second, and third necessary clock frequencies F1, F2, and F3. In making this determination, the larger of the necessary clock frequencies F1 and F2 is first selected, then the smaller of that selected frequency and the necessary clock frequency F3 is selected.

If, as above, F1=502.6 kHz, F2=807.2 kHz, and F3=1.64 MHz, then Fmin=807.2 kHz.

And finally, in step S16, the process controller 130 selects, from the multiple types of clock signals output from the frequency divider 197, the smallest of those frequencies which are larger than the minimum clock frequency Fmin. The result of this selection is sent to the clock controller 190 as the clock selection command. The controller 195 inside the clock controller 190, upon receiving the clock selection command, generates a selection signal SEL in response to the received command and sends it to the selector 198. The selector 198 switches the clock signal CK to a clock of a frequency corresponding to the selection signal SEL.

This clock signal CK is supplied to the process controller 130, the buffer unit 140, the transfer controller 150, and the memory interface unit 160. Then, based on this clock signal CK, file data FD write and read operations are performed.

When this embodiment, as described in the foregoing, is implemented, the operating clock frequency of the disk card 100 can be altered in response to the data transfer rate between the disk card 100 and the PC 200, wherefore power consumption can be reduced without impairing data transfer performance.

A second embodiment of the present invention is next described.

The circuit configuration in the disk card in this second embodiment is the same as in the first embodiment described in the foregoing (with reference to FIGS. 1 and 2), and is therefore omitted here.

In this embodiment, some of the computational processing performed by the controller 130 in order to determine the frequency of the clock signal CK is different from that in the first embodiment described above.

Figure 4A:
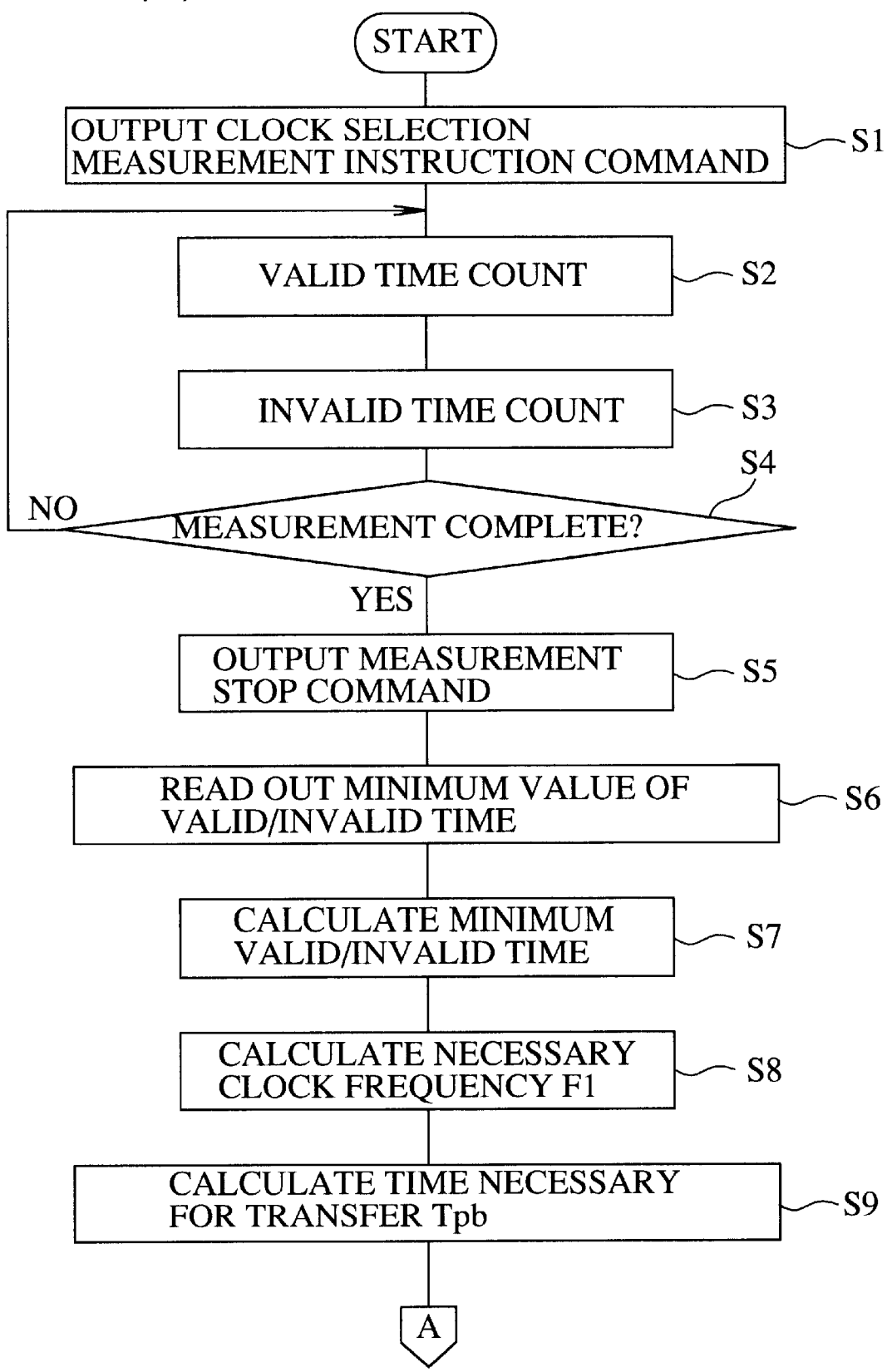
FIG. 4 is a flowchart for describing the operations of the semiconductor disk apparatus in the second embodiment.
Figure 4B:
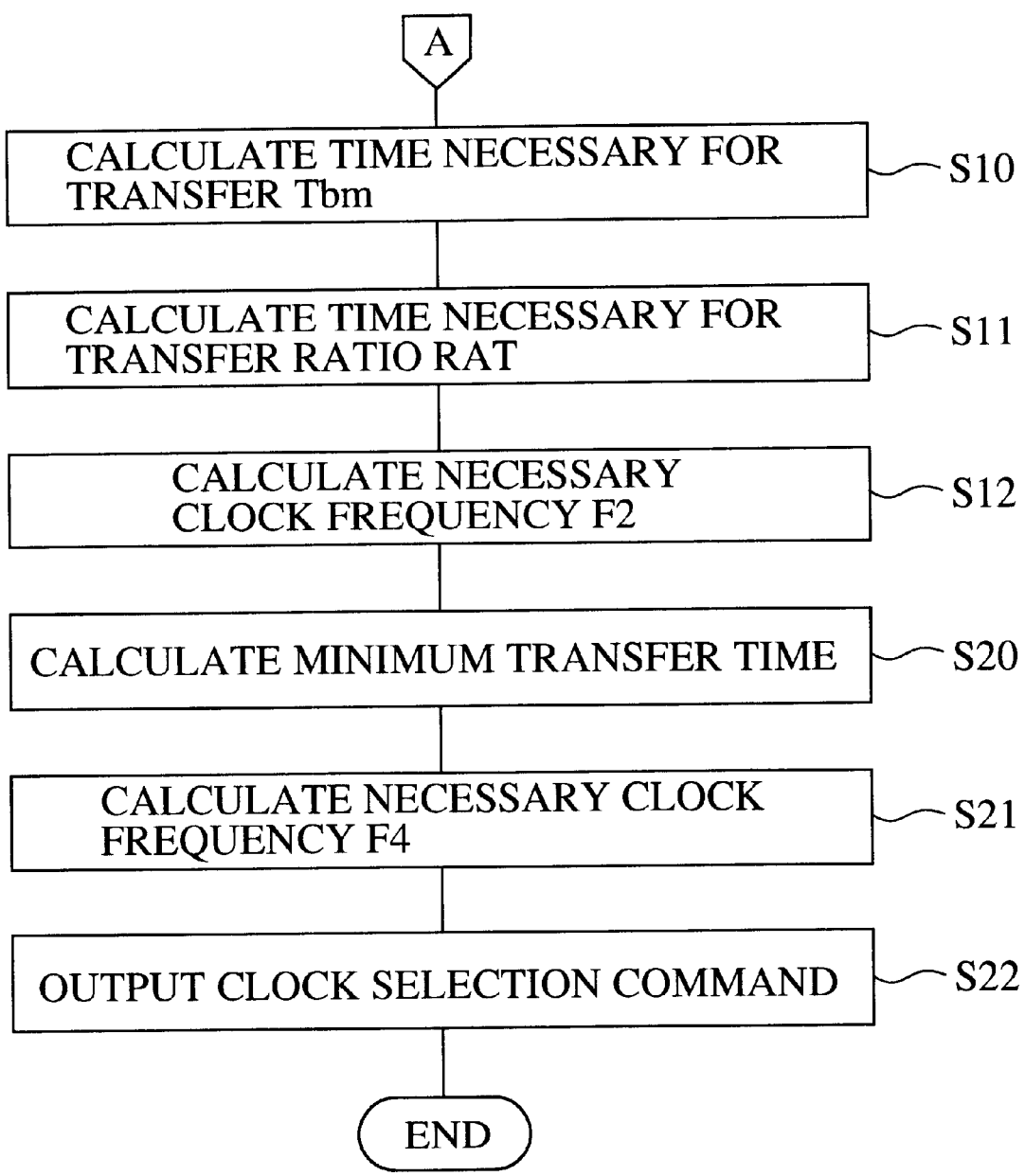

The computational processing in this embodiment is now described with reference to the flowchart in FIG. 4.

To begin with, as in the first embodiment, when power is supplied to the disk card, and the oscillator unit 199 begins oscillating at, for example, 80 MHz, a fundamental clock signal CLK is supplied to the clock controller 190.

In step S1, the process controller 130 sends a 1/1 clock selection command and a measurement instruction command to the clock controller 190. By means of this clock selection command, as in the first embodiment, a clock signal CK, at 80 MHz, for example, is supplied from the clock controller 190 to the process controller 130, buffer unit 140, transfer controller 150, and memory interface unit 160. And by means of the measurement instruction command, as in the first embodiment, the measurement control signal MES goes high, and the fundamental clock signal CLK, at 80 MHz, for example, is supplied to the counters 192a and 194a. Thus, as in the first embodiment, when the enable signal EN is high, the valid time measurement unit 192 counts the valid time (step S2), and when the enable signal EN is low, the invalid time measurement unit 194 counts the invalid time (step S3). Then, after repeating the subroutines in steps S2 to S4 until it is determined in step S4 that the number of executions of the valid time count and the invalid time count have reached a prescribed value, the measurement process is terminated in step S5. In step S6 the data REG 1 and REG 2 obtained by measurement are read out from the registers 192b and 194b and sent to the process controller 130.

Follow these processes, as in the first embodiment, the process controller 130 calculates minimum valid times and minimum invalid times using the formulas given in (1) above (step S7), calculates the necessary clock counts using the formulas given in (2) above (step S8), calculates the transfer time Tpb using formula (3) (step S9), calculates the transfer time Tbm using formula (4) (step S10), calculates the transfer time ratio RAT using formula (5) (step S11), and calculates the second necessary clock frequency F2 using formula (6) (step 12).

In step S20, the minimum transfer time per sector is calculated using formula (9) below.

$$\text{Minimum transfer time} = \frac{\text{Internal operating time in memory unit}}{\text{Number of cycles per sector}} \quad (9)$$

If, for example, the internal operating time Tm in the memory units 180-1 to 180-n is 10 ms, and the number of cycles per sector is 4096 cycles, the minimum transfer time is found as below.

Minimum transfer time=2.44 µs

The minimum transfer time is the time needed, after the completion of file data FD transfer to the memory units 180-1 to 180-n, and after the completion of the internal operations in any one memory unit 180-i, for having file data FD transferred to the next memory unit 180-j (where j=1 to n and i≠j).

In step S21, a fourth necessary clock frequency F4 is calculated using formula (10) below.

$$\text{4th necessary clock frequency } F4 = \frac{1}{\text{Minimum transfer time}} \quad (10)$$

If, for example, the minimum transfer time is 2.44 µs, the result obtained is as follows.

4th necessary transfer time F4=409.9 kHz

The process controller 130, from the multiple types of clock signal output from the frequency divider 197, selects that signal having the lowest frequency that is larger than the minimum clock frequency F4, and sends this selection result as a clock selection command to the clock controller 190. The controller 195 inside the clock controller 190, upon receiving the clock selection command, generates a selection signal SEL corresponding to that command and sends it to the selector 198. The selector 198 switches the clock signal CK to the clock having the frequency corresponding to the selection signal SEL.

This clock signal CK is supplied to the process controller 130, buffer unit 140, transfer controller 150, and memory interface unit 160. Based on this clock signal CK, file data FD write and read operations are performed.

Thus, when this embodiment is implemented, the operating clock frequency CK of the disk card 100 can be altered to accord with the data transfer rate between the disk card 100 and the PC 200, wherefore power consumption can be reduced without impairing data transfer performance.

Also, by determining the clock frequency CK using the fourth necessary transfer time F4, provision can be made so that multiple memory units do not perform internal operations simultaneously, thus making it possible to suppress increases in power supply current caused by simultaneous operations of the memory units.

A third embodiment of the present invention is described next.

The circuit configuration of the disk card in this embodiment is the same as that in the embodiments described in the foregoing (making reference to FIGS. 1 and 2), and so no further description thereof is given here.

In this embodiment, some of the computational processing performed by the controller 130 in order to determine the frequency of the clock signal CK differs from that in the first two embodiments.

Figure 5A:
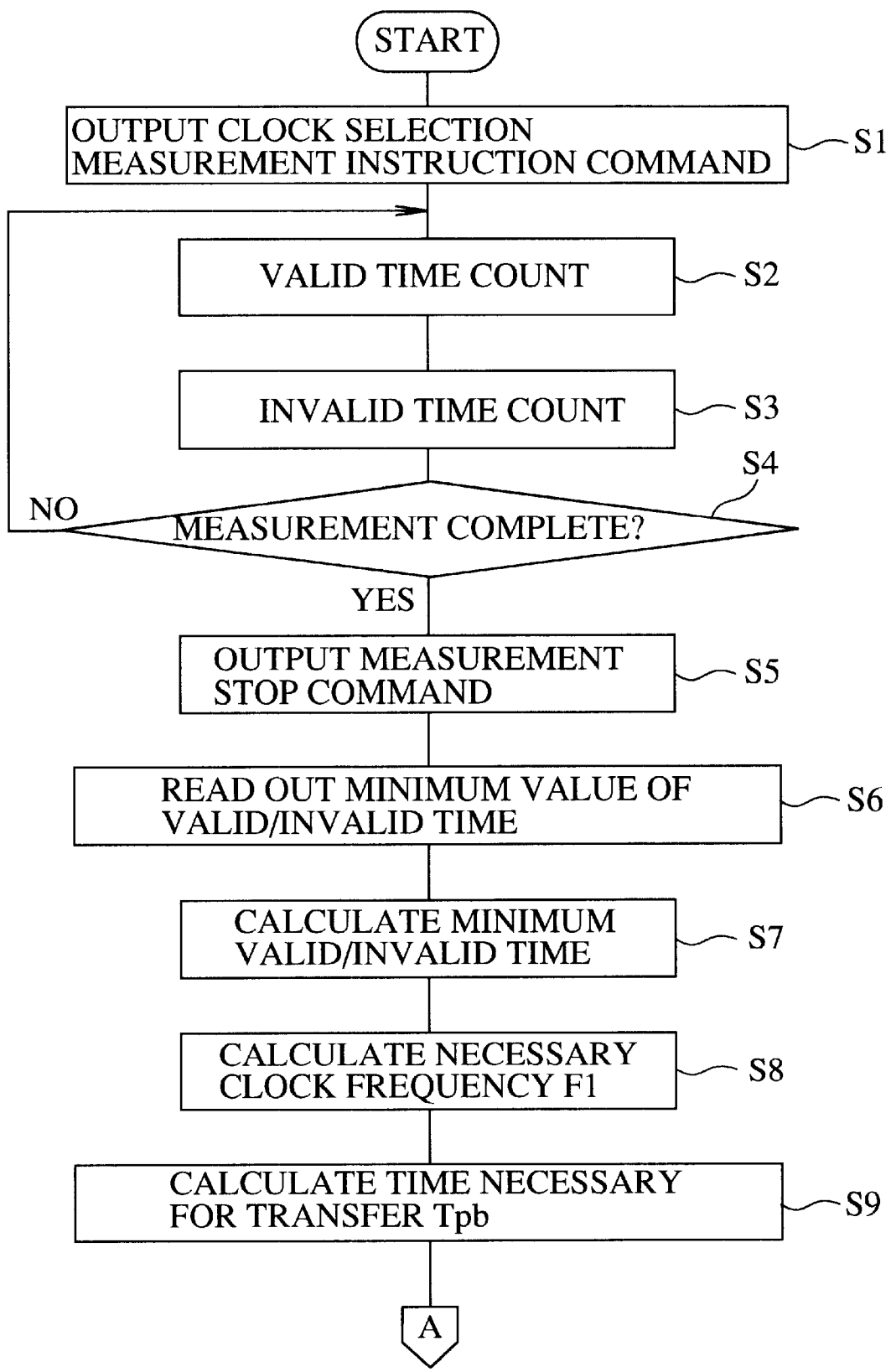
FIG. 5 is a flowchart for describing the operations of a semiconductor disk apparatus in a third embodiment.

This computational processing is now described with reference to the flowchart in FIG. 5.

To begin with, when power is supplied to the disk card as in the embodiments described earlier, and the oscillator unit 199 begins to oscillate at 80 MHz, for example, the fundamental clock signal CLK is supplied to the clock controller 190.

In step S1, when the process controller 130 sends a 1/1 clock selection command and a measurement instruction command to the clock controller 190, the clock controller 190 begins to output the clock signal CK at 80 MHz, for example.

Following this, as in the embodiments described earlier, valid time counts are performed by the valid time measurement unit 192 and invalid time counts are performed by the invalid time measurement unit 194 (steps S2 and S3). The subroutines in steps S2 to S4 are repeated until the number of executions of the valid time count and invalid time count in step S4 has reached a prescribed value, whereupon the measurement operations are terminated in step S5. The data REG 1 and REG 2 obtained by measurement are read out from the registers 192b and 194b, and sent to the process controller 130, in step S6.

Then, as in the embodiments described earlier, the process controller 130 calculates minimum valid times and minimum invalid times using the formulas in (1) (step S7), calculates the necessary clock counts using the formulas in (2) (step S8), calculates the transfer time Tpb using formula (3) (step S9), calculates the transfer time Tbm using formula (4) (step S10), calculates the transfer time ratio RAT using formula (5) (step S11), and calculates the second necessary clock frequency F2 using formula (6) (step 12).

Moreover, as in the first embodiment, the process controller 130 calculates the minimum transfer time per sector using formula (7) (step S13), calculates the third necessary clock frequency F3 using formula (8) (step S14), and calculates the minimum clock frequency Fmin (step S15).

Next, in step S30, the process controller 130 sends the minimum clock frequency Fmin to the PC 200 together with information on clock frequencies that can be selected by the clock controller 190.

The selectable clock frequencies CK sent would be, for example, 40 MHz, 20 MHz, 10 MHz, 5 MHz, 2.5 MHz, 1.25 MHz, 625 kHz, 312.5 kHz, and 156.25 kHz.

The PC 200 selects one type of clock frequency from among the clock frequencies received from the disk card 100. The PC 200 also generates an operating frequency setting command for adopting that clock frequency and sends it to the disk card 100. A clock frequency is selected at a value wherewith the overall operational performance of the PC 200 will not deteriorate.

In step S31, the process controller 130 receives an operating frequency setting command from the PC 200.

In step S32, the process controller 130 generates a clock selection command based on the operating frequency setting command and sends it to the clock controller 190. The controller 195 inside the clock controller 190, upon receiving the clock selection command, generates a selection signal SEL corresponding to the command received and sends it to the selector 198. The selector 198 switches the clock signal CK to the clock having the frequency corresponding to the selection signal SEL.

This clock signal CK is supplied to the process controller 130, the buffer unit 140, the transfer controller 150, and the memory interface unit 160. Then, based on this clock signal CK, file data FD write and read operations are performed.

Thus, when this embodiment is implemented, the operating clock frequency CK of the disk card 100 can be altered to correspond to the data transfer rate between the disk card 100 and PC 200, wherefore power consumption can be reduced without impairing data transfer performance.

Also, when determining the clock frequency CK, the operating performance of the PC 200 is taken into consideration, thus making it possible to reduce power consumption in the overall system inclusive of the PC 200.

The present invention, however, is not limited to the embodiments described in the foregoing, but is capable of various modifications. Examples of such variations are described below.

In the embodiments described in the foregoing, the description examples assume that the disk card 100 is connected to the PC 200, but the present invention can also be applied to auxiliary memory devices connected to computers built into digital cameras or work stations.

The circuit configuration of the clock controller 190 is not limited to that diagrammed in FIG. 2, but may be implemented in any configuration whatever so long as it is capable both of measuring minimum values of enable signal EN valid times and invalid times and outputting clock signals CK at prescribed frequencies.

In cases where the bit width of the file data FD sent and received between the PC 200 and the buffer unit 140 is identical to the bit width of the file data FD transferred between the buffer unit 140 and the memory units 180-1 to 180-n, the transfer ratio RAT will be 1, whereupon the subroutines in steps S9 to S12 become superfluous.

When there is but one memory unit, the subroutines in steps S13 and S14 are unnecessary.

As described in the foregoing embodiments, the operations of the process controller 130 (cf. FIGS. 3, 4, and 5) are implemented in software, but the operations corresponding to these steps may be performed using a plurality of function blocks.

When the present invention is implemented, as described in detail in the foregoing, semiconductor disk apparatuses can be provided wherewith power consumption can be reduced without any deterioration in the data transfer rates.

What is claimed is:

1. A semiconductor disk apparatus, comprising:
    a memory unit that stores data;
    a transfer circuit that transfers data input from an external apparatus to said memory unit and transfers data read from said memory unit to said external apparatus;
    an oscillator that generates fundamental clock signals of fixed frequencies;
    an operating clock supply circuit that selects the smallest frequency from divided frequencies of said fundamental clock signals that does not cause a delay of data transfer between said memory unit and said external apparatus, and supplies operating clock signals of the selected frequency to said transfer circuit;

wherein said operating clock supply circuit selects the frequencies which do not cause a delay of data transfer, using a minimum high level time and a minimum low level time of read control signals and write control signals, wherein said read and write control signals are input from said external apparatus.

2. The semiconductor disk apparatus according to claim 1, wherein said operating clock supply circuit generates the operating clock signals by performing processes of:

calculating a first necessary clock frequency that is the lowest allowable clock frequency necessary to maintain said data without causing any delay, when said data are transferred from outside in one word to said transfer circuit;

calculating a second necessary clock frequency that is the lowest allowable clock frequency necessary to prevent wait times developing in data transfers with said transfer circuit;

calculating a third necessary clock frequency that is needed to prevent delay time when two data are written to the same memory unit in succession;

determining a minimum clock frequency by selecting a larger of said first and second necessary clock frequency, then selecting a smaller of the selected necessary clock frequency and said third necessary clock frequency; and selecting the operating clock signals by selecting the smallest frequency from divided frequencies of said fundamental clock signals that are larger than said minimum clock frequency.

3. The semiconductor disk apparatus according to claim 2, wherein said first necessary clock frequency is calculated by steps of:

measuring a minimum high level time and a minimum low level time of read control signals and write control signals using said fundamental clock signals;

calculating a minimum valid time and a minimum invalid time by dividing said minimum high level time and said minimum low level time by the frequency of said fundamental clock;

calculating a valid time necessary clock frequency and a invalid time necessary clock frequency by dividing said minimum valid time and said minimum invalid time by a predetermined valid time necessary clock number and a predetermined invalid time necessary clock number; and determining said first necessary clock frequency by selecting the larger frequency between said valid and invalid time necessary clock frequency.

4. The semiconductor disk apparatus according to claim 3, wherein said second necessary clock frequency is calculated by steps of:

calculating a necessary transfer time by dividing a sum of said minimum valid time and said minimum invalid time by a transferred data number, calculating a transfer time by dividing a data transfer cycle time by a number of data transfer time per cycle;

calculating a transfer time ratio by dividing said necessary transfer time by said transfer time; and calculating said second necessary clock frequency by multiplying said first necessary clock frequency by said transfer time ratio.

5. The semiconductor disk apparatus according to claim 2, wherein said third necessary clock frequency is calculated by steps of:

calculating a minimum transfer time by dividing a internal operation time of said memory unit by a number of memory units; and calculating said third necessary clock frequency by dividing a number of cycles per sector by said minimum transfer time.

6. The semiconductor disk apparatus according to claim 2, wherein said third necessary clock frequency is calculated by steps of:

calculating a minimum transfer time by dividing an internal operation time of said memory unit by a number of cycles per sector; and calculating said third necessary clock frequency by inverting said minimum transfer time.

7. The semiconductor disk apparatus according to claim 2, wherein said operating clock signals are selected by said external apparatus.

8. The semiconductor disk apparatus according to claim 1, wherein said memory unit comprises: a plurality of memory circuits; and one memory interface unit.

9. The semiconductor disk apparatus according to claim 1, wherein said transfer circuit comprises: an interface unit for transferring data to and from an external bus; a buffer unit for transferring data to and from said interface unit; a process controller for controlling data transfer between said interface unit and said buffer unit; and a transfer controller for controlling transfers between said buffer unit and said interface unit.

10. The semiconductor disk apparatus according to claim 1, wherein said operating clock supply circuit comprises: a frequency divider for inputting said clock signals from said oscillator and generating a plurality of types of frequency-divided clock signals; a first circuit for measuring data transfer valid times; a second circuit for measuring data transfer invalid times; computation control means for determining ideal frequency-divided clocks as said operating clock, using said valid times and said invalid times; and a selector for selecting said ideal frequency-divided clock from among frequency-divided clocks output by said frequency divider and outputting same as said operating clock.

11. The semiconductor disk apparatus according to claim 10, wherein said first circuit comprises: a counter for counting clock beats of said oscillator means when either a read signal or a write signal input from the outside is at the ON level; a register for holding the smallest value of the counting results up to the previous count; and a comparator for comparing count values of said counter with values held in said register and rewriting said register holding value when said count value is smaller.

12. The semiconductor disk apparatus according to claim 10, wherein said second circuit comprises: a counter for counting clock beats of said oscillator means when both a read signal and a write signal input from the outside are at the OFF level; a register for holding the smallest value of the counting results up to the previous count; and a comparator for comparing count values of said counter with values held in said register and rewriting said register holding value when said count value is smaller.

13. The semiconductor disk apparatus according to claim 10, wherein said computation control means comprise means for calculating minimum valid times and minimum invalid times using clock counts indicating said valid times and said invalid times; means for calculating first necessary clock frequencies within said valid times and within said invalid times, using said minimum valid times and said minimum invalid times; means for calculating transfer times per bit between the outside and said transfer means, using said minimum valid times and said minimum invalid times; means for calculating transfer times per bit between said transfer means and said memory means; means for calculating time ratios between said transfer time between the outside and said transfer means, on the one hand, and said transfer time between said transfer means and said memory means, on the other; means for calculating second necessary clock frequencies by multiplying said first necessary clock frequencies and said time ratios; means for calculating minimum transfer times per sector when data are transferred between said transfer means and said memory means, by dividing said memory unit internal operating times by the number of said memory units; means for calculating third necessary clock frequencies using said minimum transfer times and the number of cycles per sector; means for comparing said third necessary clock frequency against the smaller of the first necessary clock frequency and said second necessary clock frequency, and determining the larger thereof as the minimum clock frequency; and means for selecting, from among said frequency-divided clocks generated by said frequency divider, the clock having the smallest frequency among those having a frequency greater than said minimum clock frequency.

14. The semiconductor disk apparatus according to claim 10, wherein said computation control means comprise: means for calculating minimum valid times and minimum invalid times using clock counts indicating said valid times and said invalid times; means for calculating first necessary clock frequencies within said valid times and within said invalid times, using said minimum valid times and said minimum invalid times; means for calculating transfer times per bit between the outside and said transfer means, using said minimum valid times and said minimum invalid times; means for calculating transfer times per bit between said transfer means and said memory means; means for calculating time ratios between said transfer time between the outside and said transfer means, on the one hand, and said transfer time between said transfer means and said memory means, on the other; means for calculating second necessary clock frequencies by multiplying said first necessary clock frequencies and said time ratios; means for calculating minimum transfer times per sector when data are transferred between said transfer means and said memory means, by dividing said memory unit internal operating times by the number of cycles per sector; means for calculating fourth necessary clock frequencies by finding reciprocals of said minimum transfer times; and means for selecting, from among said frequency-divided clocks generated by said frequency divider, the clock having the smallest frequency among those having a frequency greater than said fourth necessary clock frequency.

15. The semiconductor disk apparatus according to claim 10, wherein said computation control means comprise: means for calculating minimum valid times and minimum invalid times using clock counts indicating said valid times and said invalid times; means for calculating first necessary clock frequencies within said valid times and within said invalid times, using said minimum valid times and said minimum invalid times; means for calculating transfer times per bit between the outside and said transfer means, using said minimum valid times and said minimum invalid times; means for calculating transfer times per bit between said transfer means and said memory means; means for calculating time ratios between said transfer time between the outside and said transfer means, on the one hand, and said transfer time between said transfer means and said memory means, on the other; means for calculating second necessary clock frequencies by multiplying said first necessary clock frequencies and said time ratios; means for calculating minimum transfer times per sector when data are transferred between said transfer means and said memory means, by dividing said memory unit internal operating times by the number of said memory units; means for calculating third necessary clock frequencies using said minimum transfer times and the number of cycles per sector; means for comparing said third necessary clock frequency against the smaller of the first necessary clock frequency and said second necessary clock frequency, and determining the larger thereof as the minimum clock frequency; means for outputting said minimum clock frequencies and said frequency-divided clock frequencies to the outside; and means for selecting, from among said frequency-divided clocks generated by said frequency divider, a frequency-divided clock indicated by an operating frequency setting command input from the outside.

* * * * *

UNITED STATES PATENT AND TRADEMARK OFFICE
CERTIFICATE OF CORRECTION

PATENT NO.    : 6,587,956 B1
DATED         : July 1, 2003
INVENTOR(S)   : Shinji Hiratsuka It is certified that error appears in the above-identified patent and that said Letters Patent is hereby corrected as shown below:

<u>Title page,</u>
Item [73], Assignee, after "Ltd." insert -- Tokyo --.

Signed and Sealed this

Eleventh Day of November, 2003

JAMES E. ROGAN
*Director of the United States Patent and Trademark Office*